US 6,702,280 B2

(12) United States Patent
Blank et al.

(10) Patent No.: US 6,702,280 B2
(45) Date of Patent: Mar. 9, 2004

(54) APPARATUS AND PROCESS FOR TRANSPORTING SHEET-SHAPED PRINT MATERIALS

(75) Inventors: Kurt Blank, Ebersbach (DE); Olaf Martens, Mühlhausen (DE); Jürgen Ries, Ostfildern (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 0 days.

(21) Appl. No.: 10/207,570

(22) Filed: Jul. 29, 2002

(65) Prior Publication Data

US 2003/0057627 A1 Mar. 27, 2003

(30) Foreign Application Priority Data

Jul. 30, 2001 (DE) .......................... 101 37 165
Sep. 26, 2001 (DE) .......................... 101 47 485

(51) Int. Cl.$^7$ ............................... B65H 9/16
(52) U.S. Cl. ............ 271/248; 271/227; 271/253; 271/226
(58) Field of Search ................. 271/226, 227, 271/248, 251, 241, 253

(56) References Cited

U.S. PATENT DOCUMENTS

| 2,116,391 A | | 5/1938 | Gochoel | |
|---|---|---|---|---|
| 3,568,554 A | | 3/1971 | Wiechec | |
| 3,741,536 A | * | 6/1973 | Anderson | ........... 271/274 |
| 3,877,336 A | | 4/1975 | Hillesheimer | |
| 3,949,653 A | | 4/1976 | Schröter | |
| 4,051,779 A | * | 10/1977 | Zaagman | ........... 101/242 |
| 4,079,647 A | | 3/1978 | Elder et al. | |
| 4,213,361 A | | 7/1980 | Kanervo | |
| 4,227,685 A | | 10/1980 | Fischer | |
| 4,442,743 A | | 4/1984 | Szanto | |
| 4,594,926 A | | 6/1986 | Propheter | |
| 4,607,835 A | * | 8/1986 | Wilson et al. | ........... 271/227 |
| 4,776,577 A | | 10/1988 | Marschke et al. | |
| 4,921,566 A | | 5/1990 | Stork | |
| 4,949,607 A | | 8/1990 | Yuito | |

(List continued on next page.)

FOREIGN PATENT DOCUMENTS

| AT | 287478 | 1/1971 |
|---|---|---|
| DE | 872 949 | 4/1953 |
| DE | 7040410 U | 2/1971 |
| DE | 2 139 423 | 3/1972 |
| DE | 2 154 057 | 5/1972 |
| DE | 2 254 281 | 5/1974 |
| DE | 28 11 109 A1 | 9/1978 |
| DE | 27 20 675 A1 | 11/1978 |
| DE | 32 12 971 A1 | 12/1982 |
| DE | 34 27 686 A1 | 5/1985 |
| DE | 34 19 254 C1 | 10/1985 |
| DE | 34 39 199 C1 | 2/1986 |
| DE | 38 05 779 A1 | 9/1988 |
| DE | 37 36 509 A1 | 5/1989 |

(List continued on next page.)

OTHER PUBLICATIONS

Abstract for DE 2254281 from esp@cenet (Jan. 28, 2003).
Abstract for DE 2720675 from esp@cenet (Jan. 27, 2003).
Abstract for DE 2811109 from esp@cenet (Jan. 27, 2003).
Abstract for DE 3212971 from esp@cenet (Jan. 28, 2003).

(List continued on next page.)

*Primary Examiner*—Donald P. Walsh
*Assistant Examiner*—Kaitlin Joerger
(74) *Attorney, Agent, or Firm*—Kevin L. Leffel

(57) ABSTRACT

According to one aspect of the invention, an apparatus and process are provided for transporting sheet-shaped print material. A first transport element and a first contact element are actuated to transport a sheet-shaped print material with alignment against an alignment stop. A second transport element and a second contact element are actuated to transport sheet-shaped print material past the alignment stop without alignment against the alignment stop.

20 Claims, 3 Drawing Sheets

U.S. PATENT DOCUMENTS

| | | | |
|---|---|---|---|
| 5,080,340 A | | 1/1992 | Hacknauer et al. |
| 5,088,367 A | | 2/1992 | Cracchiolo et al. |
| 5,162,857 A | | 11/1992 | Higeta et al. |
| 5,280,903 A | * | 1/1994 | Herrick, Jr. ............... 271/251 |
| 5,511,744 A | | 4/1996 | Abe et al. |
| 5,577,719 A | * | 11/1996 | Nicoll ...................... 271/227 |
| 5,662,018 A | | 9/1997 | Klein |
| 5,669,277 A | | 9/1997 | Perrone |
| 5,746,162 A | | 5/1998 | Hosoi et al. |
| 5,774,688 A | | 6/1998 | Georgitsis et al. |
| 5,836,439 A | | 11/1998 | Coyette |
| 5,887,502 A | | 3/1999 | Yamaguchi et al. |
| 5,906,305 A | | 5/1999 | Knorr |
| 5,984,302 A | * | 11/1999 | Garrone .................... 271/227 |
| 6,065,379 A | | 5/2000 | Shinno et al. |
| 6,168,153 B1 | * | 1/2001 | Richards et al. ............ 271/227 |
| 6,220,327 B1 | | 4/2001 | Rothwell et al. |
| 6,241,242 B1 | | 6/2001 | Munro |
| 6,250,868 B1 | | 6/2001 | Schmücker |
| 6,289,777 B1 | | 9/2001 | Hartmann et al. |
| 6,374,715 B1 | | 4/2002 | Takatsuka |
| 6,391,132 B1 | | 5/2002 | Kinnemann et al. |
| 2002/0000149 A1 | | 1/2002 | Miura et al. |
| 2002/0011706 A1 | * | 1/2002 | Dobberstein et al. ....... 271/226 |
| 2002/0149497 A1 | | 10/2002 | Jaggi |
| 2003/0033915 A1 | | 2/2003 | Glemser et al. |
| 2003/0033916 A1 | | 2/2003 | Blank et al. |
| 2003/0035143 A1 | | 2/2003 | Glemser et al. |
| 2003/0036468 A1 | | 2/2003 | Blank et al. |

FOREIGN PATENT DOCUMENTS

| | | |
|---|---|---|
| DE | 39 11 698 A1 | 10/1989 |
| DE | 40 30 600 A1 | 4/1992 |
| DE | 43-08-934 A1 | 9/1994 |
| DE | 196 16 945 A1 | 10/1997 |
| DE | 196 42 110 A1 | 4/1998 |
| DE | 198 15 369 A1 | 10/1999 |
| DE | 199 19 345 C1 | 9/2000 |
| DE | 100 49 016 A1 | 4/2001 |
| DE | 100 07 126 A1 | 9/2001 |
| EP | 0 795 502 B1 | 9/1997 |
| EP | 0 864 517 A2 | 9/1998 |
| EP | 1 029 640 A2 | 8/2000 |
| GB | 2 099 797 A | 12/1982 |
| JP | 60-258040 | 2/1985 |
| JP | 63-174733 | 7/1988 |
| JP | 9-29696 | 2/1997 |
| JP | 11-77593 | 3/1999 |
| WO | WO 98/55278 | 12/1998 |
| WO | WO 99/55278 | 11/1999 |

OTHER PUBLICATIONS

Abstract for DE 3419254 from esp@cenet (Jan. 28, 2003).
Abstract for DE 3427686 from esp@cenet (Jan. 28, 2003).
Abstract for DE 3439199 from esp@cenet (Jan. 21, 2003).
Abstract for DE 3736509 from esp@cenet (Jul. 26, 2002).
Abstract for DE 3805779 from esp@cenet (Jul. 26, 2002).
Abstract for DE 3911698 from esp@cenet (Jul. 26, 2002).
Abstract for DE 4030600 from esp@cenet (Jan. 28, 2003).
Abstract for DE 4308934 from esp@cenet (Jan. 28, 2003).
Abstract for DE 10007126 from esp@cenet (Jan. 21, 2003).
Abstract for DE 10049016 from esp@cenet (Jan. 28, 2003).
Abstract for DE 19616945 from esp@cenet (Jul. 26, 2002).
Abstract for DE 19642110 from esp@cenet (Jul. 26, 2002).
Abstract for DE 19815369 from esp@cenet (Jan. 28, 2003).
Abstract for DE 19919345 from esp@cenet (Jan. 21, 2003).
Abstract for EP 0795502 from esp@cenet (Jan. 28, 2003).
Abstract for EP 1029640 from esp@cenet (Jan. 21, 2003).
Abstract for WO 9855278 from esp@cenet (Jan. 28, 2003).
Patent Abstracts of Japan for 09029696 (Feb. 04, 1997).
Patent Abstracts of Japan for 11077593 (Mar. 23, 1999).
Patent Abstracts of Japan for 60258040 (Dec. 19, 1985).
Patent Abstracts of Japan for 63-174733 (Jul. 19, 1988).
Abstract for DE 2254281 from Derwent International Patent Family File database (DIPF 1974–40062V).
Abstract for DE 2720675 from Derwent International Patent Family File database (DIPF 1978–K0768A).
Abstract for DE 2811109 from Derwent International Patent Family File database (DIPF 1978–H7548A).
Abstract for DE 3212971 from Derwent International Patent Family File database (DIPF 1982–B0299J).
Abstract for DE 3419254 from Derwent International Patent Family File database (DIPF 1985–257288).
Abstract for DE 3427686 from Derwent International Patent Family File database (DIPF 1985–117180).
Abstract for DE 3439199 from Derwent International Patent Family File database (DIPF 1986–056499).
Abstract for DE 3736509 from Derwent International Patent Family File database (DIPF 1989–131601).
Abstract for DE 3805779 from Derwent International Patent Family File database (DIPF 1988–259372).
Abstract for DE 3911698 from Derwent International Patent Family File database (DIPF 1989–310620).
Abstract for DE 4030600 from Derwent International Patent Family File database (DIPF 1992–115342).
Abstract for DE 4308934 from Derwent International Patent Family File database (DIPF 1994–295203).
Abstract for DE 10007126 from Derwent World Patents Legal databse (DWPL 2001–502759).
Abstract for DE 10049016 from Derwent International Patent Family File database (DIPF 2001–344674).
Abstract for DE 19616945 from Derwent World Patents Legal databse (DWPL 1997–515259).
Abstract for DE 19642110 from Derwent World Patents Legal databse (DWPL 1998–241408).
Abstract for DE 19815369 from Derwent International Patent Family File database (DIPF 1999–572897).
Abstract for DE 19919345 from Derwent International Patent Family File database (DIPF 2000–566302).
Abstract for JP 09029696 from Derwent International Patent Family File database (DIPF 1997–160284).
Abstract for JP 11077593 from Derwent International Patent Family File database (DIPF 1999–259285).
Abstract for EP 795502 from Derwent International Patent Family File database (DIPF 1997–450774).
Abstract for EP 1029640 from Derwent International Patent Family File database (DIPF 2000–545073).
Abstracts for WO 9855278 from Derwent World Patents Legal database (DWPL 1999–045604).
Handbook of Print Media, H. Kipphan (ISBN 3–54067326–1), Chapter 1, Fundamentals (Springer, 2001) (German edition published and introduced to the market during the book fair in Frankfurt/Main in Oct. 2000).
Handbook of Print Media, H. Kipphan (ISBN 3–540–67326–1), Chapter 7, Print Finishing Processes (Springer, 2001) (German edition published and introduced to the market during the book fair in Frankfurt/Main in Oct. 2000).
Software translation of JP 09–029696 from the Japanese Patent Office.

Software translation of JP 11–077593 from the Japanese Patent Office.
Translation of DE Application No. 101 37 165.9 (priority document).
Translation of DE Application No. 101 46 923.3.
Translation of DE Application No. 101 47 485.7 (priority document).
Translation of DE Application No. 101 56 375.2.
Translation of DE Application No. 102 09 090.4.
Search Report for DE application No. 102 09 090.4 (Feb. 06, 2003).
Search Report for DE application No. 101 37 165.9 (Jun. 25, 2002).
Search Report for DE application No. 101 46 923.3 (Jun. 03, 2002).
Search Report for DE application No. 101 47 485.7 (Sep. 27, 2002).
Search Report for DE application No. 101 56 375.2 (Oct. 10, 2002).
Translation of relevant portions of DE Search Report for DE application No. 101 37 165.9.
Translation of relevant portions of DE Search Report for DE application No. 101 46 923.3.
Translation of relevant portions of DE Search Report for DE application No. 101 47 485.7.
Translation of relevant portions of Search Report for DE application No. 101 56 375.2.
US–2003/0033915, Feb. 20, 2003, Glemser, et al.
US–2003/0033916, Feb. 20, 2003, Blank, et al.
US–2003/0035143, Feb. 20, 2003, Glemser, et al.
US–2003/0036468, Feb. 20, 2003, Blank, et al.
Abstract for DE 1059333 from Derwent International Patent Family File database (DWPL 2000–483783).
Abstract for DE 4417296 from Derwent International Patent Family File database (DIPF 1995–264502).
Abstract for DE 3817463 from Derwent International Patent Family File database (DIPF 1989–349614).
Abstract for EP 1247656 from Derwent International Patent Family File database (DWPL 2003–060789).
Search Report for DE application No. 102 90 090.4 (Feb. 06, 2003).
Translation of relevant portions of DE Search Report for DE application No. 102 90 090.4.

* cited by examiner

APPARATUS AND PROCESS FOR TRANSPORTING SHEET-SHAPED PRINT MATERIALS

BACKGROUND

The invention relates to an apparatus for transporting sheet-shaped print materials.

The majority of devices used in print processing and further processing require transporting paper or other sheet-shaped print materials through the device. In this process, the sheet-shaped print materials are aligned in different ways and manners, especially in the feeder area. Alignment of the sheet-shaped print materials is usually necessary in order to be able to carry out processing procedures in precise register, for instance, the printing of the sheet-shaped print materials with different colors, precisely-positioned folding or placement of holes in individual sheets.

For lateral alignment of the sheet-shaped print materials, stops are frequently used, against which the sheet-shaped print material is guided. So, for example in folding machines, transport elements like inclined transport rollers or a diagonally running belt are used to guide the sheet-shaped print materials against a stop during further transport. In order to improve or allow for contact between the sheet-shaped print materials and the transport elements, contact elements are frequently assigned to the transport rollers to produce adequate contact pressure between sheet-shaped print materials and transport elements. For this purpose, ball rails, among other things, are used. These ball rails have recesses in which balls that can turn freely are placed. Plastic or metal balls can be used for this. The balls are selected such that they, with respect to their surface finish and weight, are optimally matched to the characteristics of the sheet-shaped print materials, e.g., base weight, surface finish, etc.

In many applications, especially in copiers and/or digital printers, which typically have a number of different sheet formats in different supply bins, it is necessary to adapt the alignment of the sheet-shaped print materials to the format of the sheet-shaped print materials. Therefore, the stops are generally adjustable.

In further print processing applications, usually a high degree of flexibility is necessary so that a further processing device often consists of a plurality of individual processing devices that are arranged one after the other and connected to each other. Often the term used for this is an "inline" configuration of the individual processing devices. During inline further processing, not all of the individual processing devices are always active in further processing of the printed product. However, changing the existing configuration can usually only be carried out with great effort. Therefore, it is desirable and/or necessary that the individual processing devices that are not involved are switched off or operate in bypass mode. In this case, the sheet-shaped print materials must be transported from one individual processing device to the next without any changes, especially without changes to their alignment.

SUMMARY OF THE INVENTION

According to one aspect of the invention, an apparatus and process are provided for transporting sheet-shaped print material. A first transport element and a first contact element are actuated to transport a sheet-shaped print material with alignment against an alignment stop. A second transport element and a second contact element are actuated to transport sheet-shaped print material past the alignment stop without alignment against the alignment stop.

DETAILED DESCRIPTION

Figure 1:
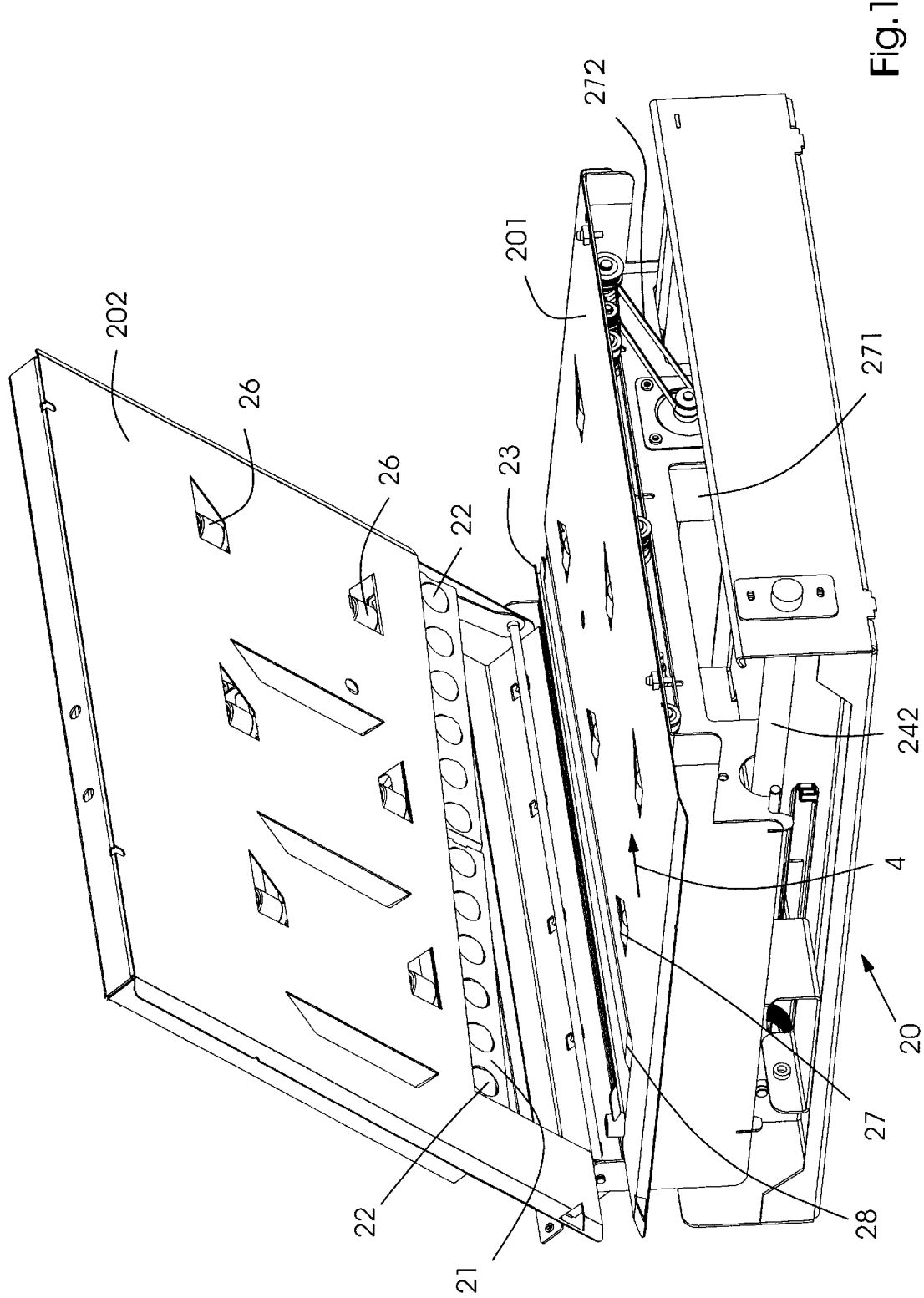
FIG. 1 presents a schematic view of an embodiment of the apparatus according to one aspect of the present invention with the upper table swung up.
Figure 2:
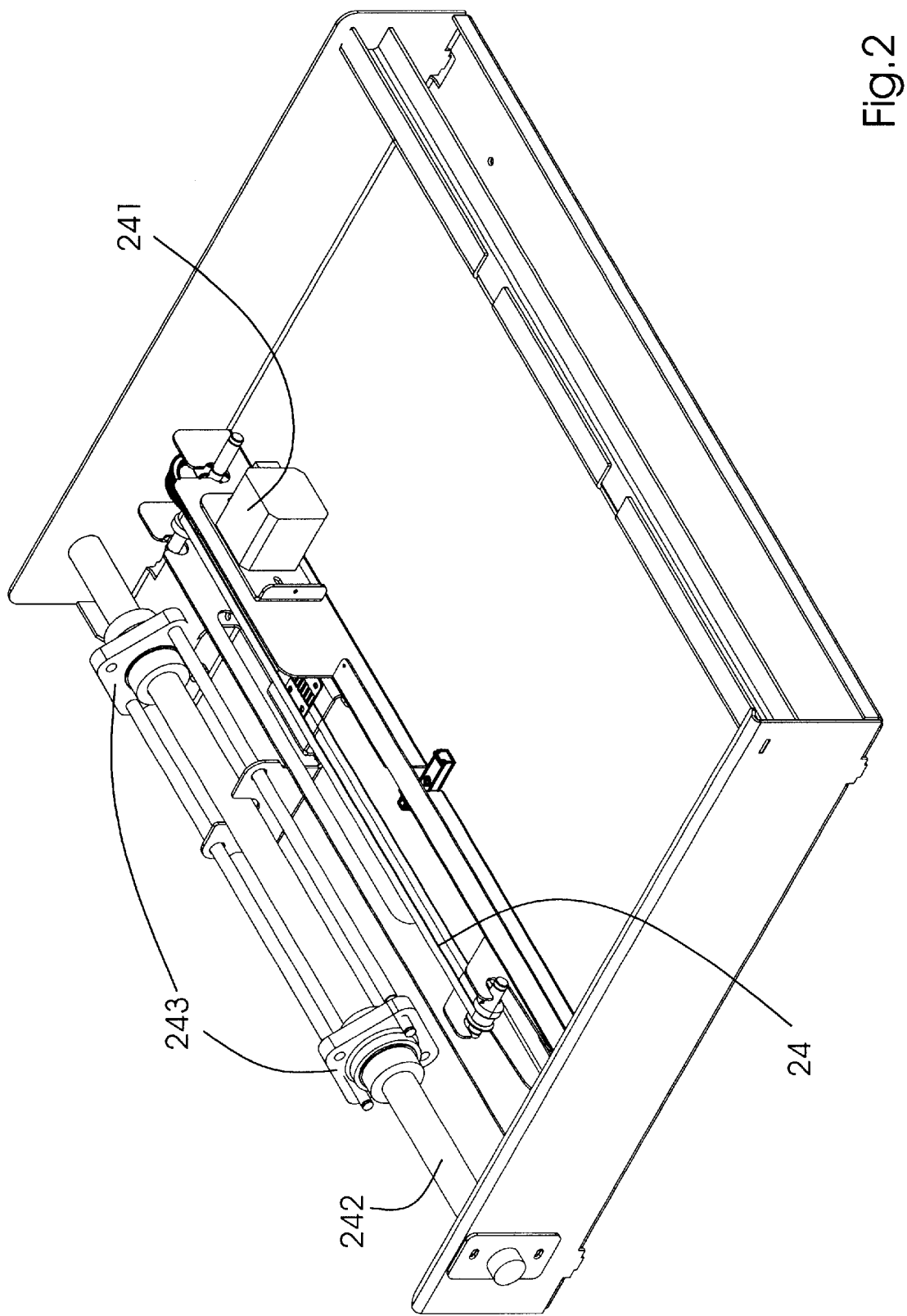
FIG. 2 presents a schematic view of the underside of the lower table of the apparatus according to the present invention.
Figure 3:
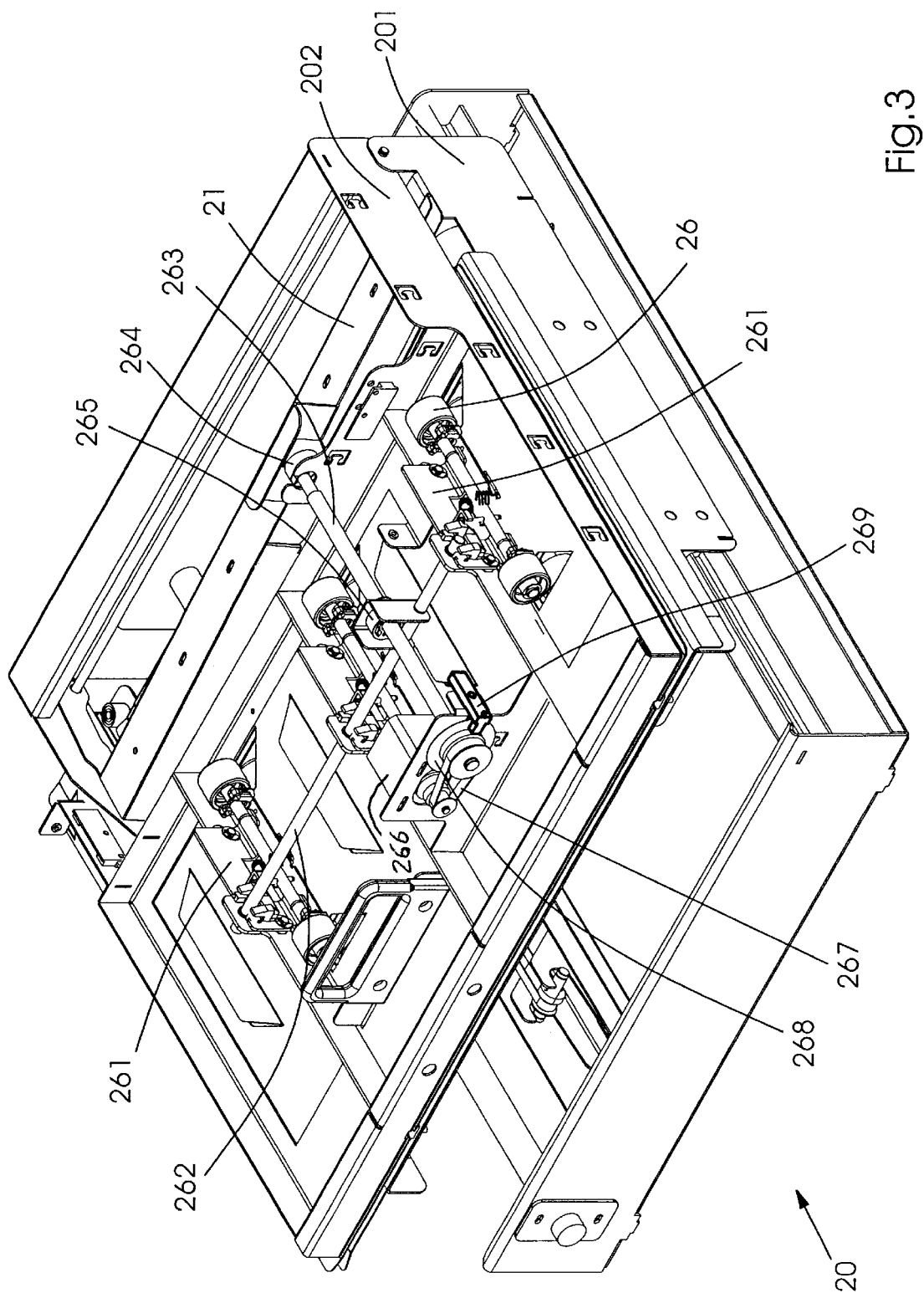
FIG. 3 presents a schematic view of the apparatus according to the present invention with the upper table swung down.

Various aspects of the invention are presented in FIGS. 1–3, wherein like components in the numerous views are numbered alike. Generally known mechanical components, such as drive and/or guide elements implemented in carrying out the invention are shown schematically and/or are described in a general way, such components not being critical in the practice of the invention, and generally known in the mechanical arts in light of the description provided herein.

Referring now specifically to FIG. 1, an apparatus 20 comprises a lower table 201 and an upper table 202. Upper table 202 is mounted to the lower table 201 so that it can swing, ensuring the ability to pivot up and provide easy access to the space between the lower table 201 and the upper table 202.

Lower table 201 is mounted on two guide rods 242 that are fastened in the housing of the apparatus 20 on two roller bearings 243. As FIG. 2 shows, on the underside of the housing of the apparatus 20 there is a motor 241 that drives a belt 24 by way of a transmission with the aid of which the lower table 201 can be moved precisely along guide rod 242. At the same time as the movement of the lower table 201, the upper table 202 that is mounted so that it can swing also moves.

The lower table comprises a first transport element 28 that is designed as a diagonally running transport belt 28, and two transport elements 27 that are designed as three pairs of transport rollers 27. The transport elements 27, 28 work together with assigned contact elements 22, 26 that are mounted in the upper table 202. Because of the contact elements 22, 26, an incoming sheet-shaped print material, which travels along the transport path through the apparatus 20 in the direction of the arrow marked with reference number 4, is brought in contact with transport elements 27, 28 such that the friction between sheet-shaped print material and the transport elements 27, 28 is adequate to transport the sheet-shaped print material through the apparatus. Transport elements 27, 28 are driven collectively by means of a motor 271, mounted on the lower table 201, by way of a belt 272 and a transmission (not shown) of a type known in the art.

On the lower table 201 there is also a stop 23, against which the transport element 28, in cooperation with the first contact element 22, guides a sheet-shaped print material. Since the lower table 201 can be moved laterally as described above, the stop 23 can also be moved laterally with respect to the transport path.

The apparatus 20 is designed so that with the aid of the movable stop 23 a sheet-shaped print material having a width between 150 mm to 400 mm can be aligned centrally with respect to the transport path through the apparatus 20.

A control determines the position of stop 23 depending on the format of the incoming sheet-shaped print material. For this purpose, the control receives instructions with regard to the format of the incoming sheet-shaped print material and the spacing of the center line of the sheet-shaped print material to the center line of the transport path planned for the sheet-shaped print material. The instructions can be transmitted to the control by upstream sensors of a type known in the art or retrieved from a memory of a type known in the art, in which information about the format of the sheet-shaped print material was previously stored. The control is of the type known for use in sheet handling machines.

First contact elements 22 and second contact elements 26 are mounted in upper table 202. The first contact elements are designed as balls 22 that are mounted so that they can turn freely in a ball rail 21. Plastic and/or metal balls are used for this purpose, which are coordinated in weight and surface finish to the sheet-shaped print materials being transported so that sheet-shaped print materials with a base weight of 50 $g/m^2$ to 300 $g/m^2$ can be guided against stop 23 in cooperation with the transport element 28.

One example of a coupling mechanism between the first contact element 22 and the second contact element 26 is presented in FIG. 3, on the upper side of the upper table 202. There is another motor 266 that drives a drive rod 263, that is mounted on the apparatus so that it can turn, by means of a belt drive 267. A first eccentric element 264 and a second eccentric element 265 are mounted on drive rod 263. The first eccentric element 264 is in contact with ball rail 21 and is mounted on the drive rod 263 in such a way that the rotation of the drive rod 263 results in a lifting or lowering of the ball rail 21. By lifting the ball rail 21, the first contact elements 22 are also lifted and thus lose contact with first transport element 28.

The second eccentric element 265 is in contact with a connecting rod 262 and is mounted on drive rod 263 in such a way that the rotation of drive rod 263 causes a forward or backward movement of the connecting rod 262. The connecting rod 262 is in active connection, by way of lever 261, with the second contact elements 26 so that a forward or backward movement of connecting rod 262 causes a lifting or lower of second contact elements 26.

The first eccentric element 264 and second eccentric element 265 are fastened to each other on the drive rod 263 in such way that when first contact elements 22 are lowered, the second contact elements 26 are lifted and vice versa, when the second contact elements 26 are lowered, the first contact elements 22 are lifted. In this way, at all times only the first contact elements 22 work together with first transport elements 28 or second contact elements 26 work together with second transport elements 27 in order to transport a sheet-shaped print material through the apparatus 20. Due to the position of the drive rod 263 it is possible to determine whether an incoming sheet-shaped print material is transported through the apparatus 20 without any alignment.

In order to control the position of drive rod 263, the drive rod 263 is equipped with a marking 268 that turns along with the rod so that a sensor 269 can monitor the position of the drive rod 263. The marking 268 that turns along with the rod is implemented, e.g., using a perforated disk.

The apparatus described here for transporting sheet-shaped print materials is particularly useful for inline further processing of printed products from digital printing machines. Use in all copiers/printers in which sheet-shaped print materials are either optionally aligned or not aligned in bypass mode is also a possibility. Use in sheet-fed offset printing machines or further processing devices like folding, sealing or stapling devices is within the scope of the invention described here.

As is evident from the description provided herein, a control and memory may be provided, with the aid of which the change between the first transport element and the second transport element occurs automatically according to an instruction stored in the memory means. The instruction can be inputted here by the operator when setting up the printing and/or further processing procedure, or by a control that determines with the aid of a sensor, whether an incoming sheet-shaped print material will be aligned or guided in bypass mode through the apparatus without alignment.

The instruction can also be carried out by a mechanism that is mounted before the apparatus. This mechanism transfers the sheet-shaped print materials to the apparatus or the instruction is carried out by a central control unit that coordinates the entire printing and/or further processing procedure. In this way, operator intervention is not necessary when the apparatus is in operation.

The first transport element may be a driven, diagonally running belt that guides the sheet-shaped print material laterally against a stop.

The stop may be moved laterally. In this way, alignment can be adapted to different formats of the sheet-shaped print materials. The alignment of the sheet-shaped print materials is advantageously carried out with respect to the center line of the sheet-shaped print materials relative to the center line of the transport path or at specified distances from the center line of the transport path.

Lateral adjustment of the stop may occur automatically, responsive to the control and memory, according to an instruction stored in the memory. The instruction can also be inputted here by the operator when setting up the printing and/or further processing procedure or be carried out by a control that determines, with the aid of sensors, which format the incoming sheet-shaped print material has and to what location the stop will have to be moved in order to achieve an appropriate alignment of the sheet-shaped print material. The instruction can also be carried out based on the format of the sheet-shaped print material and the corresponding position of the stop by a mechanism mounted before the apparatus that transfers the sheet-shaped print material to the apparatus. Also a central control unit that coordinates the entire printing and/or further processing procedure can carry out the instruction. In this way, operator intervention is not necessary for changing the stop and thus for format adjustment of the apparatus during operation.

A motor-driven belt or a spindle or a cam plate may carry out the lateral displacement of the stop, as well as other suitable mechanisms.

The second transport elements may be driven pairs of transport rollers and the second contact elements may be counterpressure rollers that are used to produce contact pressure between sheet-shaped print material and the second transport elements so that transport of the sheet-shaped print materials occurs without alignment.

The first contact elements may be balls, whereby the balls are arranged so that they can turn freely in a ball rail and the balls as a result of their weight and surface finish produce contact pressure between sheet-shaped print material and the first transport element. Since the balls can turn freely around any axis, they do not make any marks on the sheet-shaped print material when it passes through the apparatus at an angle to the transport direction. The balls may be metal and/or plastic balls wherein it is possible to safely transport sheet-shaped print materials with a sheet weight of 50 g/m² to 300 g/m² and different materials like paper and transparencies.

A coupling mechanism between a ball rail and second contact element may be provided that comprises a drive rod, which is fastened to the apparatus so that it can turn, as well as a first eccentric element in contact with the ball rail and a second eccentric element in contact with a connecting rod, whereby the first eccentric element and the second eccentric element are mounted on the drive rod; and a connecting rod and lever that produce an effective connection between the second eccentric element and the second contact elements.

The apparatus may comprise a lower table and an upper table, whereby the coupling mechanism and the contact elements are mounted in the upper table located above the transport path of the sheet-shaped print materials and the upper table is attached to the lower table so that it can swing. Because of this, it is easy to open the transport path of the sheet-shaped print materials through the apparatus, for instance, to eliminate a paper jam.

The apparatus may comprise a sensor and a marking, by means of which the functional position of the contact elements is monitored.

Although the invention has been described and illustrated with reference to specific illustrative embodiments thereof, it is not intended that the invention be limited to those illustrative embodiments. Those skilled in the art will recognize that variations and modifications can be made without departing from the true scope and spirit of the invention as defined by the claims that follow. It is therefore intended to include within the invention all such variations and modifications as fall within the scope of the appended claims and equivalents thereof.

What is claimed is:

1. An apparatus for transporting sheet-shaped print material, comprising:
    a first transport element and a first contact element;
    an alignment stop;
    a second transport element and a second contact element; and,
    a coupling mechanism between said first contact element and said second contact element configured to alternatively actuate said first transport element and said first contact element to transport the sheet-shaped print material with alignment against said alignment stop, and said second transport element and said second contact element to transport the sheet-shaped print material past said alignment stop without alignment against said alignment stop.

2. The apparatus of claim 1, further comprising a control and memory, configured to automatically actuate said coupling mechanism according to an instruction stored in said memory.

3. The apparatus of claim 1, wherein said first transport element comprises a driven, diagonally-running belt that guides the sheet-shaped print material laterally against said stop.

4. The apparatus of claim 1, wherein said stop can be moved laterally.

5. The apparatus of claim 4, further comprising a control and memory configured to automatically initiate lateral movement of said stop according to an instruction stored in said memory.

6. The apparatus of claim 4, wherein one of a motor driven belt, a spindle, and a cam plate moves said stop laterally.

7. The apparatus of claim 1, wherein said second transport element comprises a pair of transport rollers and said second contact element comprises a counterpressure roller.

8. The apparatus of claim 1, wherein said first contact element comprises balls mounted in a ball rail so that they can turn freely.

9. The apparatus of claim 8, wherein said coupling mechanism between said ball rail and said second contact element comprises a drive rod that can turn, as well as a first eccentric element in contact with said ball rail and a second eccentric element in contact with a connecting rod, wherein said first eccentric element and said second eccentric element are fastened on said drive rod, and a connecting rod and lever that produce an effective connection between the second eccentric element and second contact elements.

10. The apparatus of claim 9, wherein the first eccentric element and second eccentric element are mounted on said drive rod in such a way that by rotation of said drive rod either said first contact element or said second contact element are lifted or lowered respectively.

11. The apparatus of claims 1, further comprising a lower table and an upper table, said coupling mechanism and said first contact element being mounted in said upper table above a transport path mounted on said lower table so that it can swing.

12. The apparatus of claim 1, wherein the device has a sensor and a marking, by means of which the functional position of the contact elements can be monitored.

13. A process for transporting sheet-shaped print material, comprising:
    actuating a first transport element and a first contact element to transport sheet-shaped print material with alignment against an alignment stop; and,
    actuating a second transport element and a second contact element to transport sheet-shaped print material past said alignment stop without alignment against said alignment stop.

14. The process of claim 13, further comprising automatically actuating transport of sheet-shaped print material by said first transport element and said first contact element with alignment against said alignment stop, and transport of sheet-shaped print material by said second transport element and said second contact element without alignment against said alignment stop, with a control according to an instruction stored in a memory.

15. The process of claim 13, further comprising driving sheet-shaped print material laterally against a stop with a driven, diagonally-running belt.

16. The process of claim 13, further comprising moving said alignment stop laterally.

17. The process of claim 16, further comprising automatically initiating lateral movement of said alignment stop with a control according to an instruction stored in a memory.

18. A process for transporting sheet-shaped print material, comprising:
    actuating a first transport element and a first contact element to transport a sheet-shaped print material with alignment against an alignment stop; and,
    actuating a second transport element and a second contact element to transport sheet-shaped print material past said alignment stop without alignment against said alignment stop interdependent with said actuating said first transport element and said first contact element.

19. The process of claim 18, further comprising automatically initiating lateral movement of said alignment stop with a control according to an instruction stored in a memory.

20. The process of claim 18, further comprising automatically actuating transport of sheet-shaped print material by said first transport element and said first contact element with alignment against said alignment stop, and transport of sheet-shaped print material by said second transport element and said second contact element without alignment against said alignment stop, with a control according to an instruction stored in a memory.

* * * * *